May 30, 1950      R. OLINGER      2,509,743
MOTOR TESTING APPARATUS
Filed Aug. 6, 1945      3 Sheets-Sheet 1
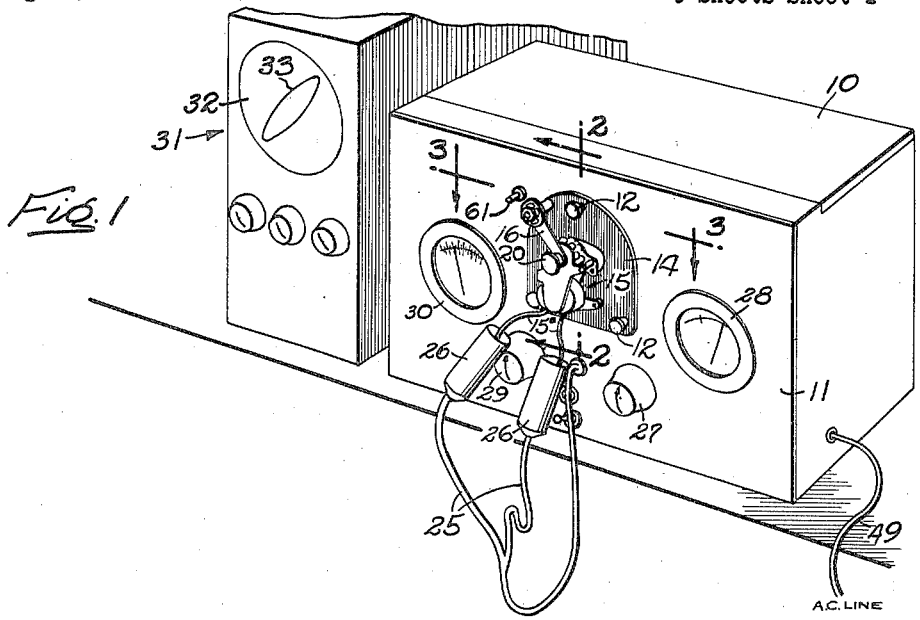
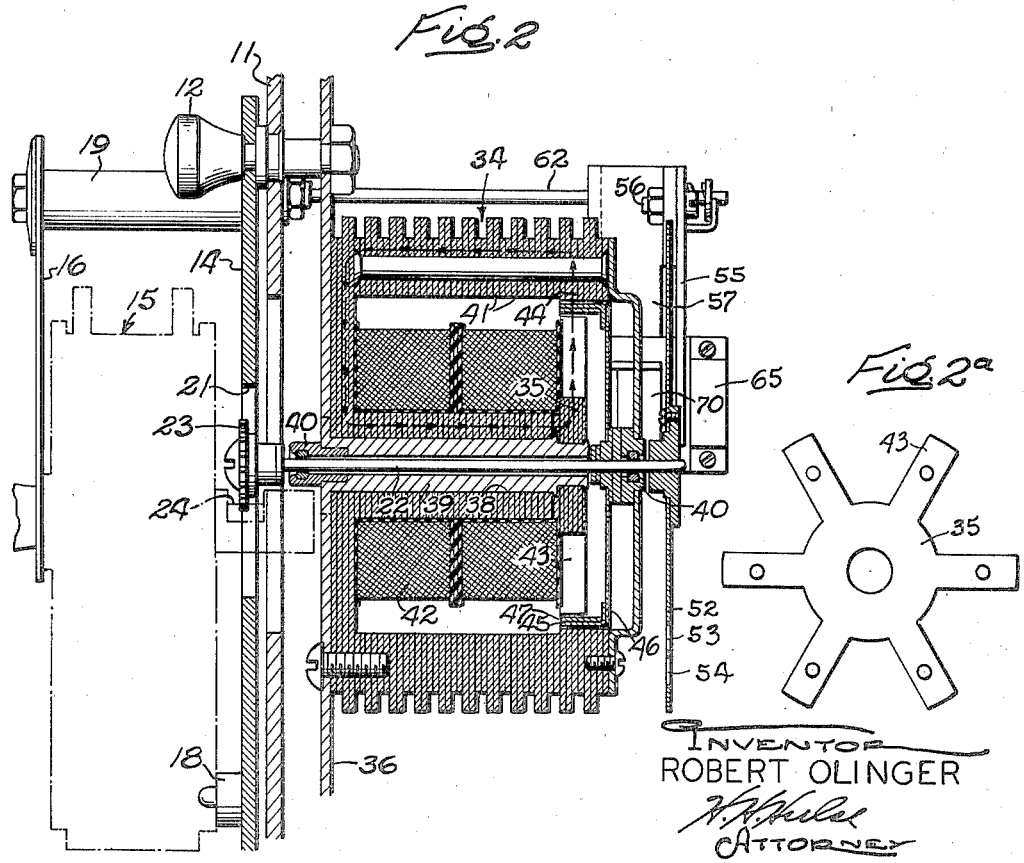
INVENTOR
ROBERT OLINGER May 30, 1950 R. OLINGER 2,509,743
MOTOR TESTING APPARATUS
Filed Aug. 6, 1945 3 Sheets-Sheet 2
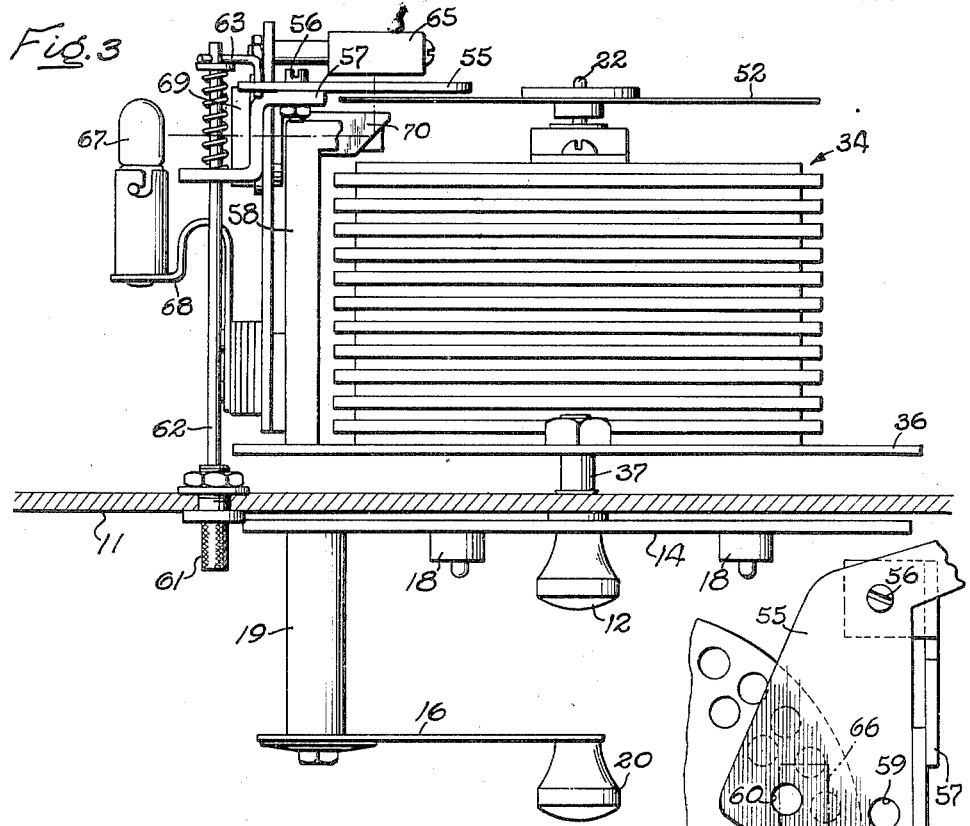
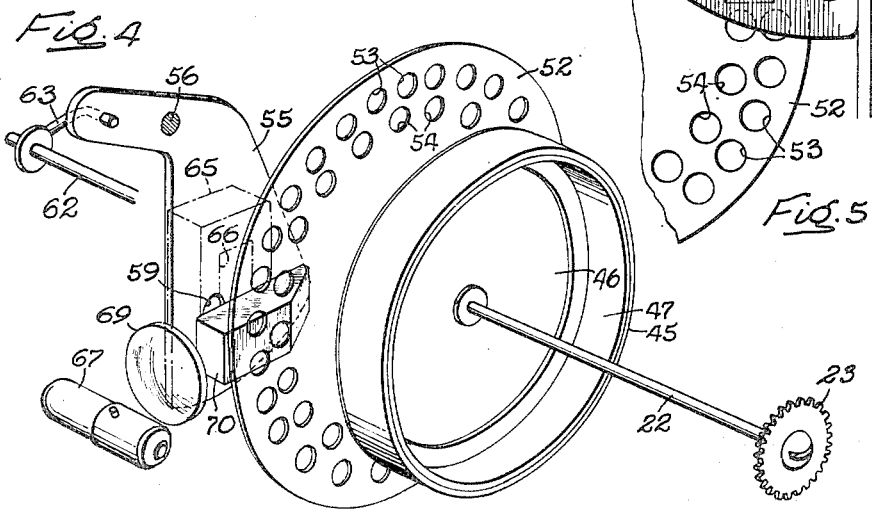
INVENTOR
ROBERT OLINGER
ATTORNEY May 30, 1950  R. OLINGER  2,509,743
MOTOR TESTING APPARATUS
Filed Aug. 6, 1945  3 Sheets-Sheet 3
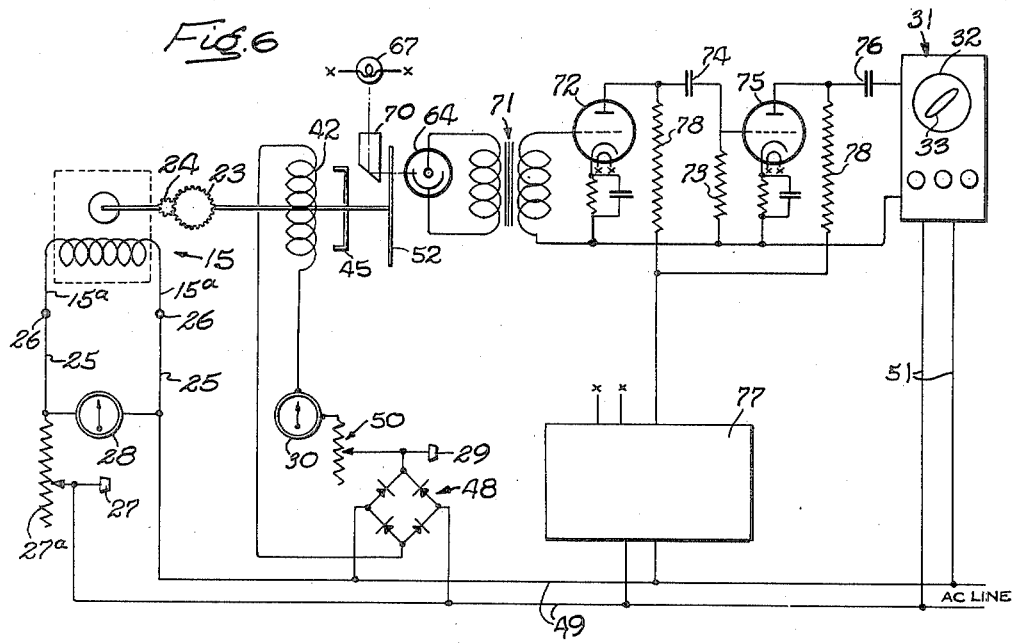
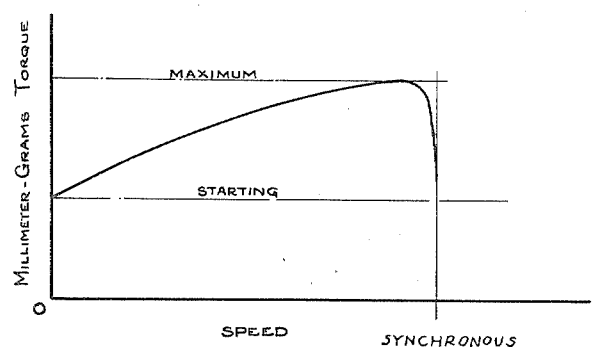
INVENTOR
ROBERT OLINGER
ATTORNEY Patented May 30, 1950

2,509,743

UNITED STATES PATENT OFFICE 2,509,743

MOTOR TESTING APPARATUS

Robert Olinger, La Salle, Ill., assignor to General Time Corporation, New York, N. Y., a corporation of Delaware Application August 6, 1945, Serial No. 609,184

2 Claims. (Cl. 73—116)

The present invention pertains to a novel apparatus for testing electric motors and particularly their torque.

One general object of the present invention is to provide a testing apparatus suitable for use in the quantity production of small alternating current, synchronous electric clock motors, and the like, and by means of which the synchronous torque, maximum torque, and starting torque of such a motor can be readily ascertained by a comparatively unskilled operator.

More particularly, it is an object to provide a testing apparatus of the character indicated which by a few simple manipulations can be adjusted or converted to accommodate any one of a wide variety of individual styles of motors differing from each other, for example, in reference to mechanical construction, supply voltage required, etc.

Another object is to provide a unit type of testing outfit of the general character indicated which is especially suited for portability, ease of set-up, and simplicity of operation.

Further objects and advantages of the invention will become apparent as the following description proceeds taken in connection with the accompanying drawings, in which:

Figure 1 is a general perspective view of a testing apparatus embodying the present invention, the same being shown with a motor in place thereon ready for test.

Fig. 2 is an enlarged fragmentary sectional view taken substantially along the line 2—2 in Fig. 1, the motor under test being indicated in broken lines.

Fig. 2a is an elevational view of one of the salient pole pieces of the stator of the electromagnetic drag device.

Fig. 3 is a fragmentary sectional view taken substantially along the line 3—3 in Fig. 1.

Fig. 4 is a fragmentary detail perspective view of the rotatable shutter and drag motor subassembly included in the testing outfit of Fig. 1, as well as the parts coacting with the rotary shutter to constitute the optical system of the apparatus.

Fig. 5 is a fragmentary face view of a portion of the rotary shutter in Fig. 4, as well as the coacting selection shutter.

Fig. 6 is a generally schematic wiring diagram of the testing apparatus shown in Fig. 1.

Fig. 7 is a typical torque characteristic curve of one of the small clock motors of the general type which the illustrated apparatus was designed to test.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the illustrative embodiment of the invention shown in the drawings, the outfit there shown includes a unit housed within a generally rectangular casing 10 having a front panel 11. Removably fixed to this front panel by studs having knurled nuts 12 threaded thereon is an adapter plate 14 and on which may be removably mounted a motor to be tested, such a motor being indicated at 15. Since the adapter plate 14 is itself removable, different adapter plates may be readily applied to accommodate different specific shapes and sizes of motors. The motor 15 has been indicated as having the general size and configuration common for shaded pole synchronous electric motors, such as are used in clocks.

The motor 15 is itself secured to the adapter plate 14 by providing a resilient arm or leaf spring 16 which presses the motor against locating studs 18 on the adapter plate (see Fig. 2). The arm 16 is carried by a stud 19 and has a knob 20 on it by means of which it may be flexed outward to free the motor.

Projecting through an aperture 21 in the adapter plate 14 is the forward end of a shaft 22 (see Fig. 2) having fixed to it a gear 23. The motor 15 is located on the adapter plate in such position as to bring the drive pinion 24 of the motor into mesh with the gear 23 when the motor is in position.

Excitation current for the field of the motor 15 under test is supplied from a suitable source of alternating current through flexible leads 25 having clips 26 for connecting them to the motor field leads 15ª. The motor 15 can thus be readily installed on the adapter plate 14 in condition to drive the shaft 22.

By way of brief preliminary outline, it may be noted at this point that provision is made for applying to the motor driven shaft 22 an adjustable drag load and also for affording a visual indication of the speed imparted to the shaft under various conditions of loading. By turning a control knob 27 (Fig. 1), the operator can vary the voltage applied to the motor 15 under test, thereby accommodating such applied voltage to the rated input of the motor. The value applied is indicated by a voltmeter 28 on the front panel 11 adjacent the knob 27. With equal ease, the load applied to the motor may be varied by turning a second control knob 29, a continuous visual indication of the load being afforded by an adjacent milliammeter 30. Alongside the unit 10 is located an oscilloscope, generally designated as 31, and having a screen 32 on which appears an image 33 whose shape and movement, or lack of it, is indicative of the motor speed. The general procedure followed is to install on the adapter plate 14 a motor to be tested, apply its rated voltage, vary the applied torque, and record the starting torque, maximum torque, and synchronous torque.

An electromagnetic type drag device, designated generally as 34 (Figs. 2 and 3), is used for adjustably loading the motor driven shaft 22. In the illustrated arrangement this drag device includes a laminated magnetizable stator or core 35 fixed to a mounting plate 36 carried at the rear side of the panel 11 on a stud 37. The exterior of the stator 35 is generally cylindrical, the laminations which make up the stator being centrally apertured to afford an axially extending bore 38 in which is fixed a sleeve 39. At the opposite ends of this sleeve are mounted jewel bearings 40 in which the shaft 22 is journaled. The laminated stator 35 also presents a generally annular recess 41 opening toward its outer or rear end and in which is located an annular energizing winding 42, which encircles the central portion of the stack of laminations concentrically with the shaft 22. Spaced ones of the laminations are made of greater outside diameter than the adjacent laminations in order to afford heat dissipating fins on the exterior of the stator.

Bordering the inner edge of the mouth of the annular recess 41 is a circularly arranged series of salient pole pieces 43 on the stator (see also Fig. 2a). Upon energization of the winding 42 with direct current, a magnetic field is set up. The flux flows in a generally orbital path, the mean location of one portion of which is indicated by the arrow line 44 in Fig. 2. The direction of flux flow depends of course upon the direction of flow of current through the winding. Assuming it to be in the direction of the arrows noted, it will be seen that the flux flows through the central portion of the stator out through the projections 43, being concentrated in the latter, thence across the air gap to the outer portion of the stator and through the latter back to the central portion.

A rotor is arranged to coact with the stator structure described above. For that purpose a ring 45 made of soft silicon steel, or other magnetizable material having a low hysteresis and high eddy current loss characteristic, is arranged to rotate in the air gap between the pole pieces 43 and surrounding portion of the stator. In the present instance the ring 45 is fixed to an aluminum disk 46 which is in turn fixed to the shaft 22. Moreover, a second ring 47 also made of soft silicon steel is fixed within the ring 45 to increase the amount of ferromagnetic material in the rotor. The flux traversing the path heretofore noted passes transversely through the rings 45, 47 inducing eddy currents in them, so that as the rings revolve a drag is applied tending to resist rotation. By adjusting the excitation of the winding 42 the amount of drag imposed can be varied at will.

As indicated in the wiring diagram in Fig. 6, current for the energizing winding 42 is supplied to it through a rectifier 48 which is in turn supplied from alternating current supply lines 49. A rheostat 50, operated by the control knob 29 heretofore noted, serves to control the excitation of the winding 42. By supplying the latter winding from the same source which is used to excite the motor 15 under test, any variations in the supply voltage are imposed simultaneously and proportionately on both the motor and drag excitation winding so that they do not impair the accuracy of the test results.

Provision is made for exciting the oscilloscope 31 in accordance with the speed of the motor under test. In the present instance, that is accomplished by interrupting a beam of light with a periodicity proportionate to the motor speed and then producing electric impulses of a corresponding periodicity and which are amplified and applied to the oscilloscope.

The oscilloscope 31 itself may be of a well known commercial form and which as marketed currently bears notice of being made under United States Letters patent Nos. 1,960,333, 2,000,014, 2,014,106, 2,186,635 and 2,225,099. Such an oscilloscope has both horizontal and vertical sweep plates (not shown), the horizontal sweep plates being energized by line voltage through conductors 51 (Fig. 6), while the vertical sweep plates are energized by the signal produced from the test unit through circuits which are described below. The image or pattern 33 produced on the screen 32 appears as a thin laterally inclined loop as shown when the motor under test is operating steadily at synchronous speed. Shift and change of shape of the image takes place when there is slip in the motor. As the torque load on the motor is increased to a maximum, stalling is indicated by a straight horizontal trace or image on the oscilloscope screen 32. When the motor starts, there is a decided jerk or jumping of the image.

As to the arrangement for producing a periodic impulse for exciting the vertical sweep plates of the oscilloscope 31, it will be perceived upon reference to Figs. 2 and 4 that a rotary shutter in the form of an apertured disk 52 is fixed to the shaft 22 to turn with it. This disk is opaque and has in it a plurality of circularly arranged series of holes 53 and 54. The holes in each series are equidistantly spaced circumferentially of their own series. A plurality of series of such holes with a different number of holes in each series are provided as a means of readily accommodating the testing outfit to motors having different synchronous speeds or drive pinions with different numbers of teeth. In other words the number of holes in each series is so chosen with reference to the speed of the shaft 22 when the corresponding motor is rotating at synchronous speed that the number of flashes of light per second will be the same for all motors when they are operating at synchronous speed.

A selector shutter 55 is provided as a means of rendering a desired one of the series of holes 53 or 54 operative. For that purpose, the selector shutter is pivoted at 56 on a bracket 57 and which is in turn carried by a support 58 on the plate 36. In the shutter 55 are two holes 59 and 60 arranged to register with alternate ones of the series of holes 53 and 54 in corresponding alternate positions of the shutter 55. The latter shutter is shifted between its two alternate positions by turning a knurled knob 61 located on the front panel 11 and fixed to a rotatable shaft 62 (Fig. 3). Such shaft is journaled in the bracket 57 and has laterally projecting from it a crank arm 63 pivotally engaged with the bell crank shaped shutter 55.

Behind the shutter 55 is mounted a light sensitive element or phototube 64 (see Fig. 6) disposed in a housing 65 (see Figs. 2, 3 and 4) having an opening 66 facing toward the shutter. When the shutter 55 is in one of its two available angular positions, light is admitted through the opening 59 and successive registering ones of the holes 53 to the cell opening 66, and when the shutter is in its other alternate position, light is admitted through the shutter opening 60 and successive ones of the series of holes 54 to the cell opening.

A light beam is supplied from an electric lamp 67 mounted at one side of the rotating shutter disk 52 on a bracket 68 (Fig. 3). Light from this lamp is focused by a condensing lens 69 (Fig. 4) on a prism 70 and is turned at right angles by the latter to direct the same onto the rotating disk 52.

As each flash of light falls on the cell 64, it passes an impulse of current. Such impulses are suitably amplified and applied to the input of the oscilloscope, as for example by use of an amplifier circuit such as that shown in Fig. 6. As there shown, the phototube 64 may be connected by a coupling transformer 71 with the input of a first stage amplifier triode 72. A load resistor 73 is connected in the output circuit of the triode 72, such output circuit being coupled by a condenser 74 with the input circuit of a second stage amplifier tube shown as a triode 75. A resistor 73 is placed in the grid circuit of tube 75. Likewise, the output of this second tube is connected by a coupling condenser 76 to the vertical sweep plates of the oscilloscope 31. Plate potential for the amplifier tubes is supplied from a conventional power pack 77 by way of voltage dropping resistors 78, the power pack being energized from the supply lines 49.

In the operation of the testing apparatus described, the supply lines 49 are connected to a suitable source of alternating current and a motor 15 which is to be tested is mounted on the adapter plate 14 with its pinion 24 meshed with the gear 23. The knob 27 is turned to adjust a rheostat 27a until a voltmeter 29 indicates the proper rated voltage for the motor field and the supply connections to the field are completed by the clips 26. With the motor thus energized, it drives the shaft 22 carrying the magnetic drag rotor 45, 47 and the rotary shutter 52. The selector shutter 55 is preliminarily set by turning the knob 61 to render operative the series of holes in the rotary shutter 52 which corresponds to the synchronous speed of the particular motor being tested.

With the motor 15 running as described above, a load is imposed on it which is proportional to the current supplied to the energizing winding 42 of the magnetic drag device 34, such current being indicated continuously by the milliammeter 30. The latter can be calibrated directly in terms of torque as, for example, in millimeter-grams or, if desired, it may be calibrated simply in terms of milliamperes and a separate calibration table provided showing torque as related to current reading for different styles of motors.

By turning the knob 29 the load on the motor 15 under test is adjusted until the oscilloscope 31 indicates that it is running at synchronous speed. As heretofore noted, the image 33 produced on the oscilloscope screen 32 is, at synchronous speed, stationary and of approximately the shape illustrated for the particular style of oscilloscope shown. Having recorded the torque prevailing at synchronous speed, the operator then gradually increases the load until a stalling condition is indicated by an image on the screen 32 in the form of a straight horizontal line. The maximum torque reading available at such time is then recorded. Then the operator diminishes the load by turning the knob 29 until the motor starts, the start being indicated by a sudden jerk of the oscilloscope image. The starting torque is recorded at such time. It will thus be seen with a few simple manipulations the operator is able to obtain quickly and easily the synchronous torque, maximum torque and starting torque readings for the motor being tested. The speed-torque characteristic of a typical motor of the type adapted to be tested in the disclosed apparatus is shown in Fig. 7.

If the motor under test fails to operate precisely at synchronous speed due to even a small amount of slip, the image 33 on the oscilloscope screen 32, although approximating the shape shown, will display a peculiar movement in the course of which it shifts or drifts between approximately the 45 degree angle position shown through 90 degrees, so that it lies at an incline of approximately 45 degrees in the opposite direction and assumes the form of a figure eight in the course of such shift. This shifting of the image indicates that slip is present and the instrument can in fact be made sufficiently sensitive that it will detect a slip amounting to only about one cycle in twenty-four hours, or a loss of 1/120 of a second. If desired, those motors can be eliminated which do not come up to a pre-determined standard of time-keeping precision.

I claim as my invention:

1. In a motor testing apparatus of the general type described, an encased unit having an exterior panel, an adapter plate removably fixed on said panel and having means thereon for removably supporting a motor to be tested, an electromagnetic drag device within said unit and including an energizing winding as well as a drive shaft, the latter projecting through said panel in adjacency with said adapter plate for connection of a motor thereto mounted on the plate, means on said panel for adjusting the excitation of said winding to thereby vary the load imposed on a motor connected to said shaft, means including a meter on said panel for affording a continuous visual reading of the current consumption of said winding, and means within said unit for producing periodic electric impulses whose periodicity is continuously proportional to the speed of said shaft.

2. In a motor testing apparatus of the general type described, an encased unit having an exterior panel, an adapter plate removably fixed on said panel and having means thereon for removably supporting a motor to be tested, an electromagnetic drag device within said unit and including an energizing winding as well as a drive shaft, the latter projecting through said panel in adjacency with said adapter plate for connection of a motor thereto mounted on the plate, means on said panel for adjusting the excitation of said winding to thereby vary the load imposed on a motor connected to said shaft, means within said unit for producing periodic electric impulses whose periodicity is continuously proportional to the speed of said shaft, and means on said panel for varying the frequency of said periodic electric impulses produced by any one speed of said shaft.

ROBERT OLINGER.

REFERENCES CITED

The following references are of record in the file of this patent:

UNITED STATES PATENTS

| Number | Name | Date |
|---|---|---|
| 762,622 | Eastwood | June 14, 1904 |
| 1,473,366 | Walther | Nov. 6, 1923 |
| 1,909,103 | Greibach | May 16, 1933 |
| 2,004,950 | Jenkins | June 18, 1935 |
| 2,073,926 | Fraser | Mar. 16, 1937 |
| 2,193,079 | Schrader | Mar. 12, 1940 |
| 2,355,484 | Teker | Aug. 8, 1944 |
| 2,362,682 | Watson | Nov. 14, 1944 |
| 2,381,549 | Mabery | Aug. 7, 1945 |
| 2,405,060 | Scofield | July 30, 1946 |

FOREIGN PATENTS

| Number | Country | Date |
|---|---|---|
| 418,443 | Great Britain | Oct. 22, 1934 |